US012563376B2

(12) United States Patent
Balasubramanian et al.

(10) Patent No.: US 12,563,376 B2
(45) Date of Patent: Feb. 24, 2026

(54) VEHICLE-TO-PEDESTRIAN (V2P) COMMUNICATION AND DATA ASSOCIATION FOR PEDESTRIAN POSITION DETERMINATION AND COLLISION AVOIDANCE

(71) Applicant: QUALCOMM Incorporated, San Diego, CA (US)

(72) Inventors: Anantharaman Balasubramanian, San Diego, CA (US); Dan Vassilovski, Del Mar, CA (US); Shailesh Patil, San Diego, CA (US); Kapil Gulati, Belle Mead, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/406,489

(22) Filed: Aug. 19, 2021

(65) Prior Publication Data

US 2023/0056390 A1    Feb. 23, 2023

(51) Int. Cl.
| | |
|---|---|
| *H04W 72/00* | (2023.01) |
| *H04W 4/02* | (2018.01) |
| *H04W 4/40* | (2018.01) |
| *H04W 4/90* | (2018.01) |

(52) U.S. Cl.
CPC ............. *H04W 4/90* (2018.02); *H04W 4/026* (2013.01); *H04W 4/027* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 9,280,900 | B2 * | 3/2016 | Nomura | G08G 1/166 |
| 9,769,166 | B1 * | 9/2017 | Lai | H04L 63/0853 |
| 9,881,503 | B1 * | 1/2018 | Goldman-Shenhar | |
| | | | | B60Q 5/006 |
| 11,778,642 | B2 * | 10/2023 | Wu | H04W 76/14 |
| | | | | 370/329 |
| 12,018,947 | B2 * | 6/2024 | Jung | H04W 4/024 |
| 12,125,268 | B2 * | 10/2024 | Gauerhof | G06N 3/094 |
| 2014/0104423 | A1 * | 4/2014 | Choi | G06V 20/58 |
| | | | | 348/148 |
| 2015/0035685 | A1 * | 2/2015 | Strickland | B60Q 9/008 |
| | | | | 340/901 |
| 2015/0091715 | A1 * | 4/2015 | Nomura | G06V 40/10 |
| | | | | 340/435 |
| 2016/0046235 | A1 * | 2/2016 | Lee | H04R 5/02 |
| | | | | 381/86 |
| 2017/0287332 | A1 * | 10/2017 | Ranninger Hernandez | |
| | | | | B60W 30/09 |

(Continued)

*Primary Examiner* — Sithu Ko
(74) *Attorney, Agent, or Firm* — QUALCOMM Incorporated

(57) ABSTRACT

Various aspects relate to vehicle-to-pedestrian (V2P) communication and collision avoidance using data association of data from different vehicle-to-everything (V2X) devices. In some aspects, a V2X device (e.g., a vehicle) can determine or estimate the location of a pedestrian by associating data pertaining to the pedestrian from multiple V2X devices and sensors. The association of data can reduce the uncertainties of the V2X device in the determination of the pedestrian's location. A vehicle V2X device can send out a warning indication or alert to the pedestrian or a V2X device of the pedestrian.

20 Claims, 11 Drawing Sheets

(56)                References Cited

U.S. PATENT DOCUMENTS

| | | | |
|---|---|---|---|
| 2018/0035255 A1* | 2/2018 | Kordybach | H04W 4/40 |
| 2018/0255595 A1* | 9/2018 | Seo | H04W 4/40 |
| 2019/0037499 A1* | 1/2019 | Son | G08G 1/096791 |
| 2020/0107381 A1* | 4/2020 | Ahmad | H04W 88/04 |
| 2021/0354708 A1* | 11/2021 | Gyllenhammar | H04W 4/46 |
| 2022/0171065 A1* | 6/2022 | Li | B60W 60/0027 |
| 2022/0391693 A1* | 12/2022 | Orhon | G06V 20/10 |
| 2023/0052037 A1* | 2/2023 | Beaurepaire | G01C 21/387 |
| 2023/0176212 A1* | 6/2023 | Kim | G01S 17/04 |
| | | | 455/456.1 |
| 2024/0214786 A1* | 6/2024 | Sharma Banjade | H04W 4/40 |

* cited by examiner

800

802

Process image to determine pixel coordinates of pedestrian

804

Determine real world coordinates of pedestrian based on pixel coordinates

806

Estimate height of pedestrian based on real world coordinates

808

Compare estimated height to height reported by pedestrian/P-UE

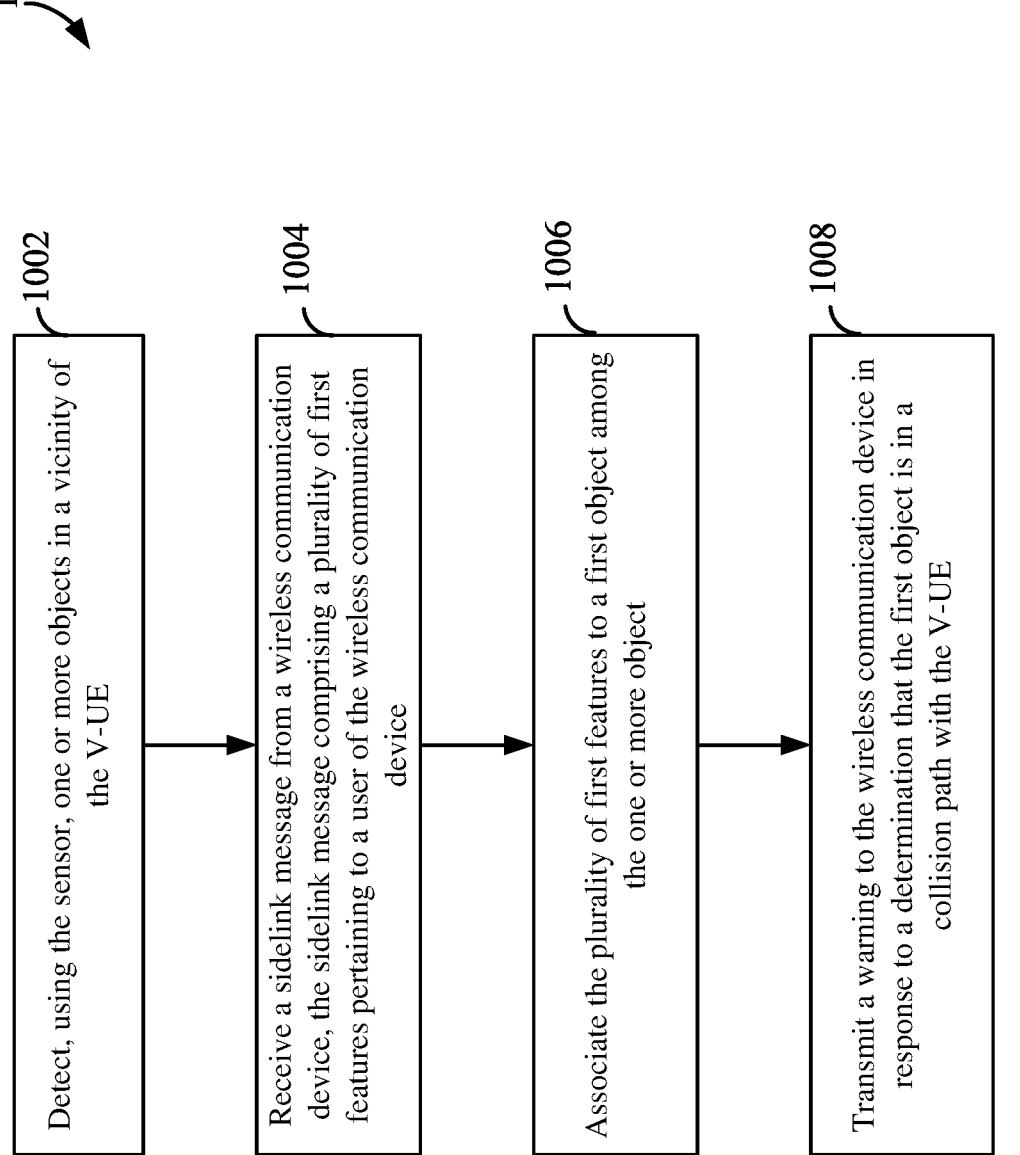

1000

1002 Detect, using the sensor, one or more objects in a vicinity of the V-UE

1004 Receive a sidelink message from a wireless communication device, the sidelink message comprising a plurality of first features pertaining to a user of the wireless communication device 1006 Associate the plurality of first features to a first object among the one or more object 1008 Transmit a warning to the wireless communication device in response to a determination that the first object is in a collision path with the V-UE

FIG. 10

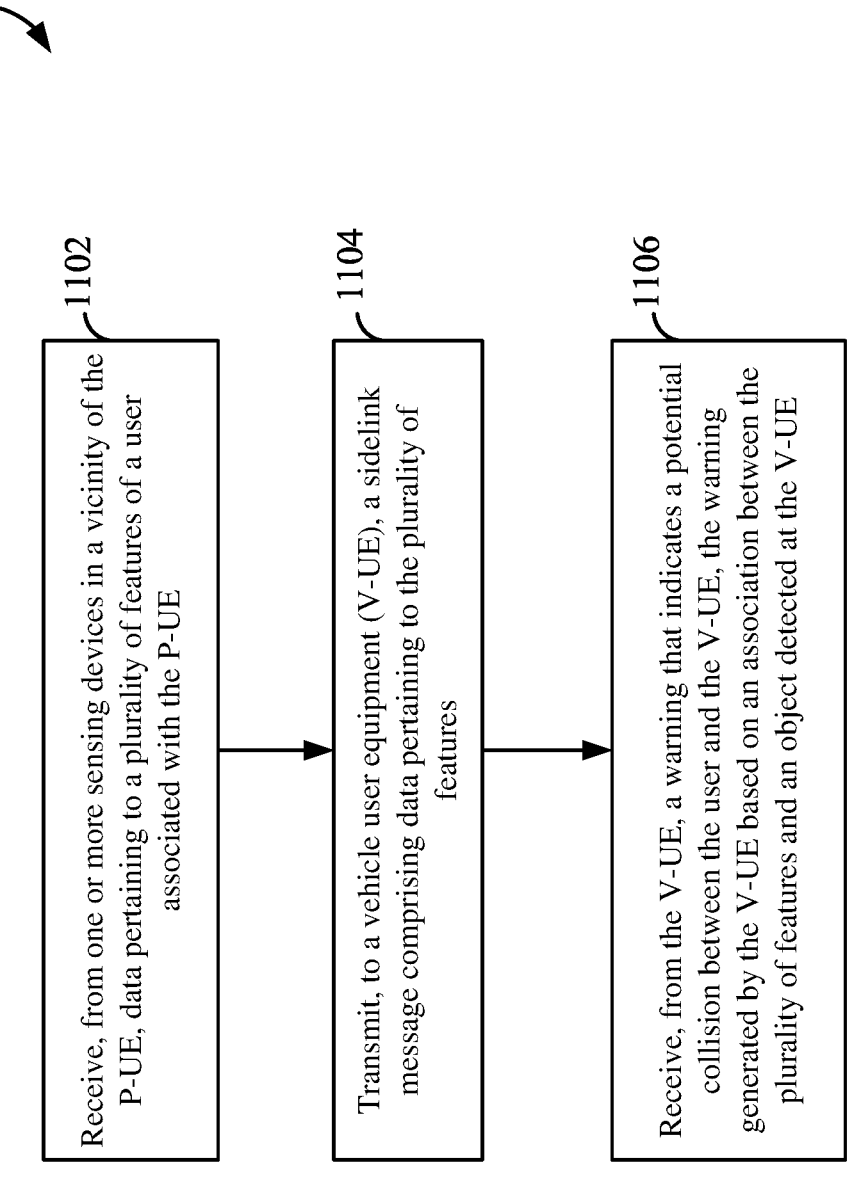

1100

1102

Receive, from one or more sensing devices in a vicinity of the P-UE, data pertaining to a plurality of features of a user associated with the P-UE

1104

Transmit, to a vehicle user equipment (V-UE), a sidelink message comprising data pertaining to the plurality of features

1106

Receive, from the V-UE, a warning that indicates a potential collision between the user and the V-UE, the warning generated by the V-UE based on an association between the plurality of features and an object detected at the V-UE

FIG. 11

VEHICLE-TO-PEDESTRIAN (V2P) COMMUNICATION AND DATA ASSOCIATION FOR PEDESTRIAN POSITION DETERMINATION AND COLLISION AVOIDANCE

TECHNICAL FIELD

The technology discussed below relates generally to wireless communication systems, and more particularly, to techniques for vehicle-to-pedestrian (V2P) communication and data association for pedestrian position determination and collision avoidance.

INTRODUCTION

Wireless communication between devices may be facilitated by various network configurations. In one configuration, a cellular network may enable user equipment (UEs) to communicate with one another through signaling with a nearby base station or cell. Another wireless communication network configuration is a device-to-device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. V2X devices, such as vehicular V2X devices, may further be equipped with an automotive camera system, radar system, and/or lidar system to sense the environment and enable safety and comfort features, such as collision avoidance and adaptive cruise control.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) in a wireless communication network. The UE includes a communication transceiver, a sensor, a memory, and a processor coupled to the communication transceiver, the sensor, and the memory. The processor and the memory are configured to detect, using the sensor, one or more objects in a vicinity of the UE. The processor and the memory are further configured to receive a sidelink message from a wireless communication device via the communication transceiver, the sidelink message comprising a plurality of first features pertaining to a user of the wireless communication device. The processor and the memory are further configured to associate the plurality of first features to a first object among the one or more objects. The processor and the memory are further configured to transmit a warning to the wireless communication device in response to a determination that the first object is in a collision path with the UE.

One aspect of the disclosure provides a user equipment (UE) in a wireless communication network. The UE includes a communication transceiver, a memory, and a processor coupled to the communication transceiver and the memory. The processor and the memory are configured to receive, from one or more sensing devices in a vicinity of the UE, data pertaining to a plurality of features of a user associated with the UE. The processor and the memory are further configured to transmit, to a vehicle, a sidelink message comprising data pertaining to the plurality of features. The processor and the memory are further configured to receive, from the vehicle, a warning that indicates a potential collision between the user and the vehicle, the warning generated by the vehicle based on an association between the plurality of features and an object detected at the vehicle.

One aspect of the disclosure provides a method of wireless communication by a user equipment (UE). The method includes detecting one or more objects in a vicinity of the UE. The method further includes receiving a sidelink message from a wireless communication device, the sidelink message comprising a plurality of first features pertaining to a user of the wireless communication device. The method further includes associating the plurality of first features to a first object among the one or more objects. The method further includes transmitting a warning to the wireless communication device in response to a determination that the first object is in a collision path with the UE.

One aspect of the disclosure provides a method for wireless communication by a user equipment (UE). The method includes receiving, from one or more sensing devices in a vicinity of the UE, data pertaining to a plurality of features of a user associated with the UE. The method further includes transmitting, to a vehicle, a sidelink message comprising data pertaining to the plurality of features. The method further includes receiving, from the vehicle, a warning that indicates a potential collision between the user and the vehicle, the warning generated by the vehicle based on an association between the plurality of features and an object detected at the vehicle.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as devices, systems, or methods, it should be understood that such exemplary implementations can be implemented in various devices, systems, and methods.

BRIEF DESCRIPTION OF THE DRAWINGS

FIG. 10 is a flow chart of an exemplary process for transmitting an alert to a pedestrian using data association between a V-UE and a P-UE in accordance with some aspects.

FIG. 11 is a flow chart illustrating an exemplary process for collecting and communicating user-specific features to a vehicle using sidelink communication according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate to vehicle-to-pedestrian (V2P) communication and collision avoidance using data association of data from different vehicle-to-everything (V2X) devices. In some aspects, a V2X device (e.g., a vehicle) can determine or estimate the location of a pedestrian by associating data pertaining to the pedestrian from multiple V2X devices and sensors. The association of data can reduce the uncertainties of the V2X device in the determination of the pedestrian's location.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
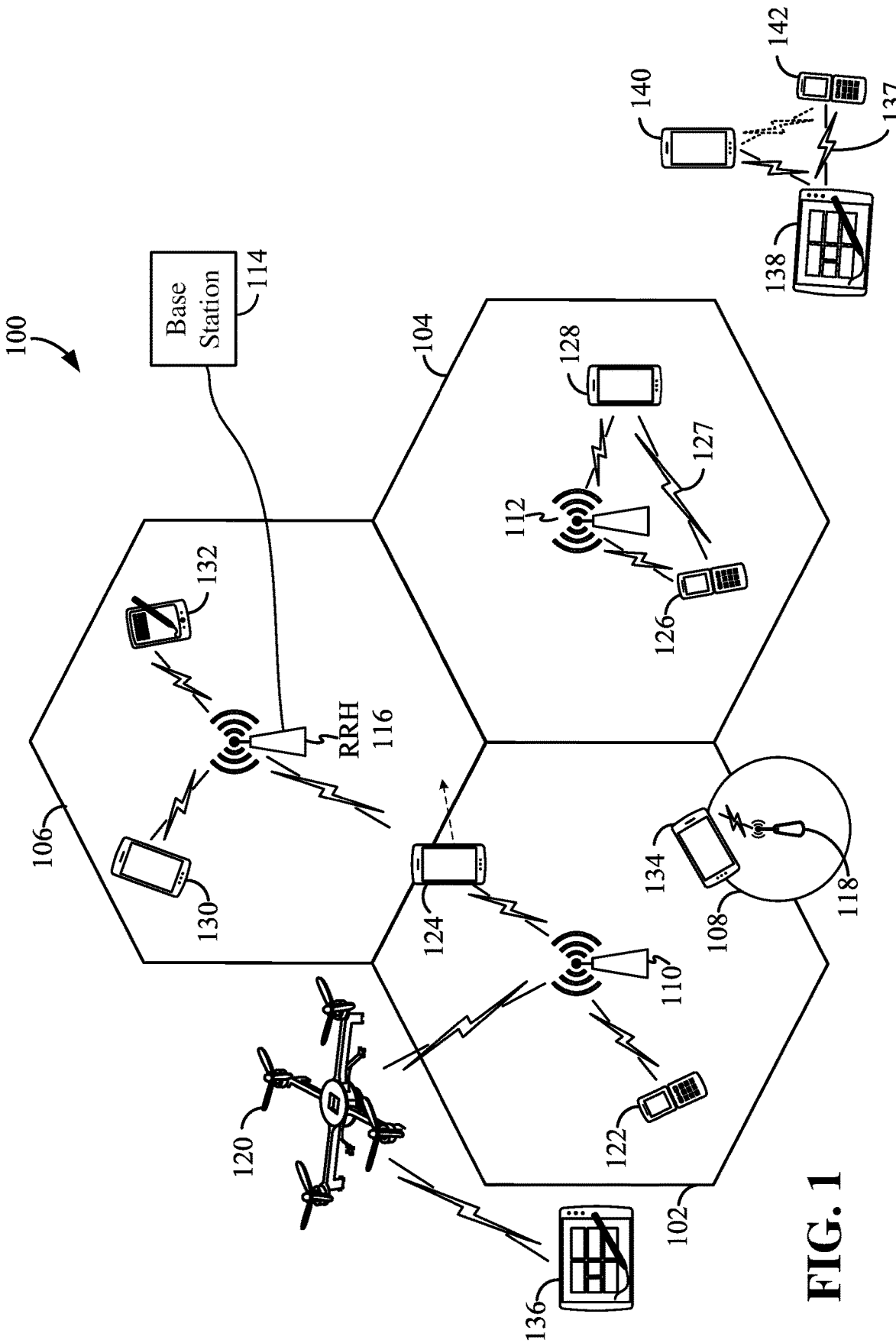
FIG. 1 is a diagram illustrating an example of a radio access network (RAN) according to some aspects.

The various concepts presented throughout this disclosure may be implemented across a broad variety of telecommunication systems, network architectures, and communication standards. Referring now to FIG. 1, as an illustrative example without limitation, a schematic illustration of a RAN 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic area covered by the RAN 100 may be divided into cellular regions (cells) that can be uniquely identified by a user equipment (UE) based on an identification broadcasted from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in cell 108 why may overlap with one or more macrocells. In this example, the cell may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a quadcopter or drone. The UAV may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

In a further aspect of the RAN 100, sidelink signals may be used between UEs without necessarily relying on scheduling or control information from a base station. For example, two or more UEs (e.g., UEs 138, 140, and 142) may communicate with each other using peer-to-peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
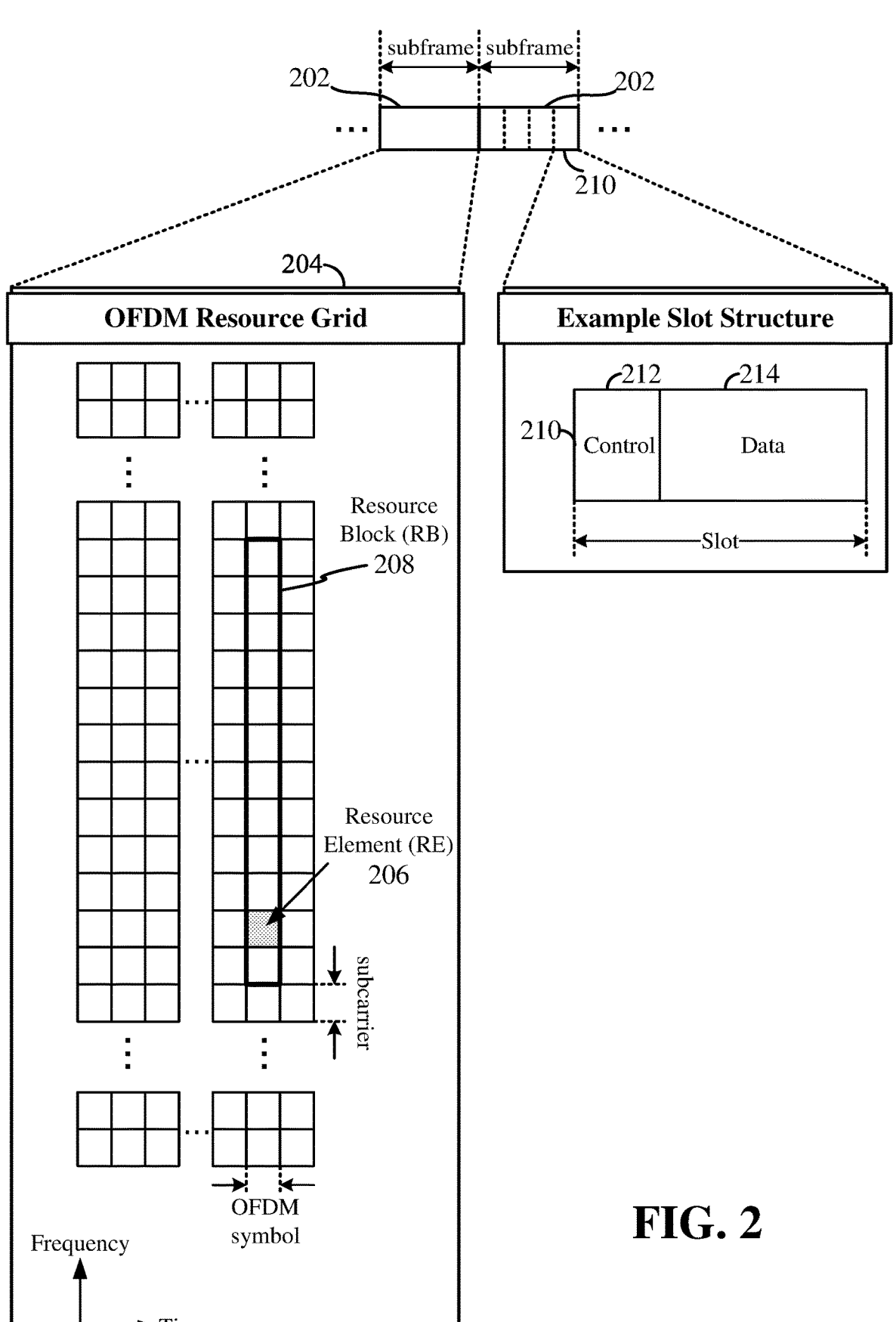
FIG. 2 is a diagram illustrating an organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE- SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a proximity service (ProSe) PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 3:
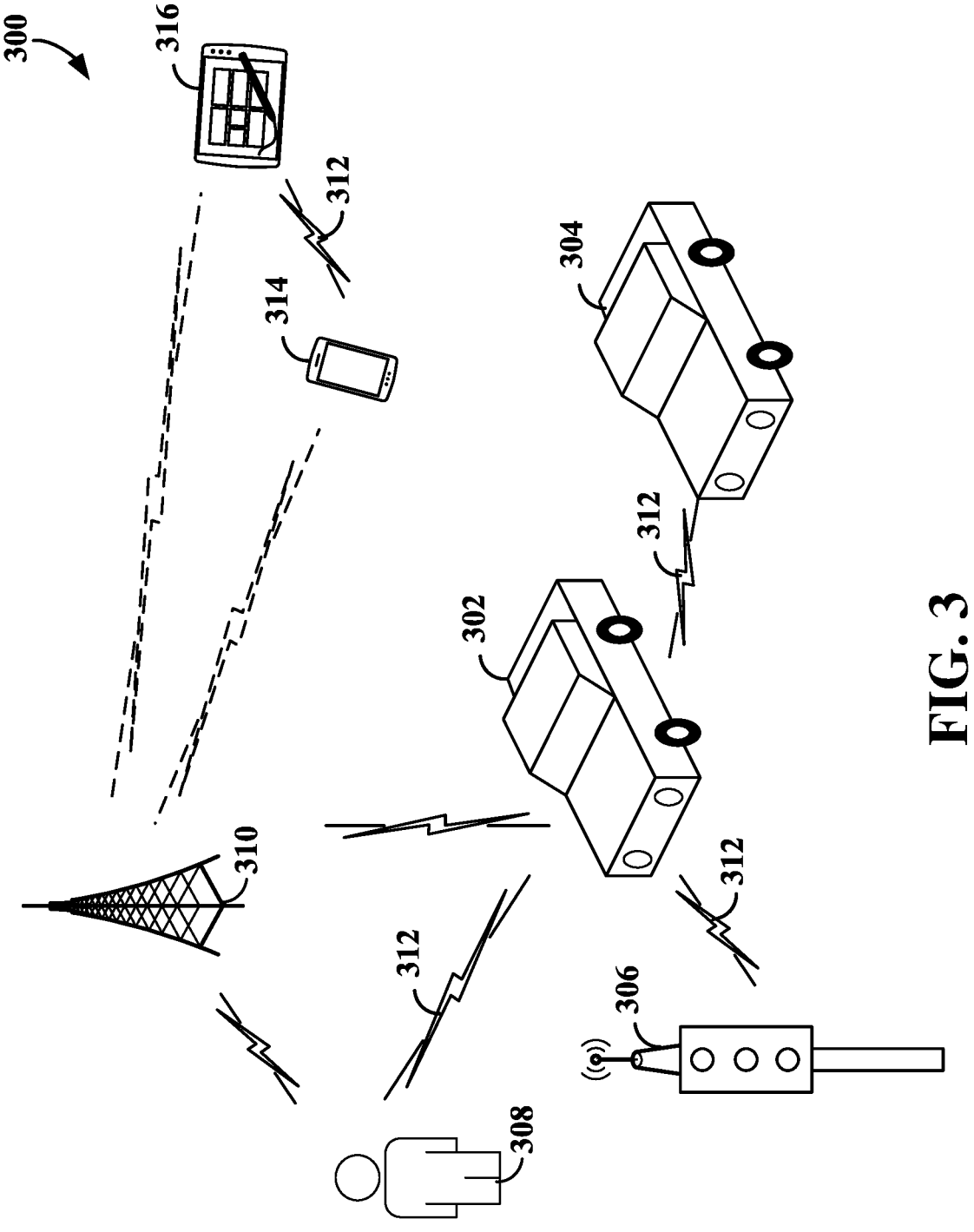
FIG. 3 is a diagram illustrating an example of a wireless communication network configured to support sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some aspects, a pedestrian or a V2X device (e.g., UE) associated with the pedestrian can be called a vulnerable road user (VRU). In some aspects, VRUs may include not only pedestrians, but also bicycle riders, road construction crew, etc. V2X devices of VRUs may include, for example, cell phones, vehicle/bike mounted hardware, smart watches, construction equipment, etc. In some examples, V2X communication may be implemented in accordance with the New Radio (NR) cellular V2X standard defined by 3GPP, Release 16, or other suitable standards.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger (e.g., approaching vehicle).

The sidelink communication between vehicle-UEs (V-UEs) 302 and 304 or between a V-UE 302 or 304 and either an RSU 306 or a pedestrian-UE (P-UE) 308 may occur over a sidelink (or sidelink channel) 312 utilizing a proximity service (ProSe) PC5 interface. In various aspects of the disclosure, the PC5 interface may further be utilized to support D2D sidelink communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D or V2X sidelink communication between, for example, V-UE 302 and P-UE 308 over the sidelink 312, the V-UE 302 and P-UE 308 may transmit discovery signals therebetween. In some examples, each discovery signal may include a synchronization signal, such as a primary synchronization signal (PSS) and/or a secondary synchronization signal (SSS) of a sidelink SSB that facilitates device discovery and enables synchronization of communication on the sidelink 312. For example, the discovery signal may be utilized by the P-UE 308 to measure the signal strength (e.g., signal-to-noise ratio (SNR)) and channel status of a potential sidelink (e.g., sidelink 312) with another UE (e.g., V-UE 302 or 304). The P-UE 308 may utilize the measurement results to select a UE (e.g., V-UE 304 or 304) for sidelink communication or relay communication.

Figure 4:
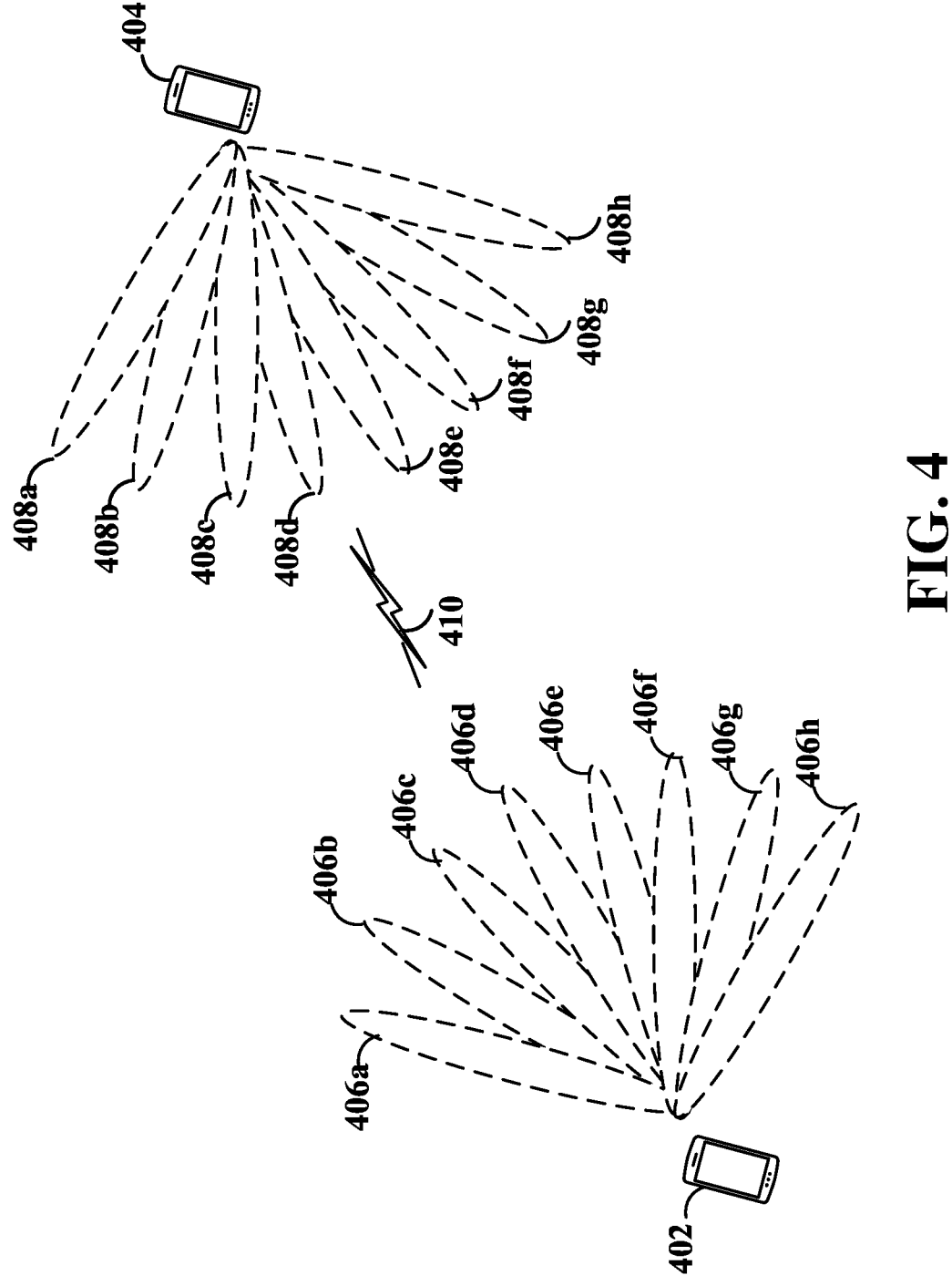
FIG. 4 is a diagram illustrating communication between wireless communication devices using beamforming according to some aspects.

FIG. 4 is a diagram illustrating communication between wireless communication devices 402 and 404 using beamformed sidelink signals according to some aspects. Each of the wireless communication devices 402 and 404 may be any of the UEs or V2X devices illustrated in any of FIGS. 1 and/or 3.

In the example shown in FIG. 4, the wireless communication devices 402 and 404 may be configured to communicate sidelink signals 410 on one or more of a plurality of beams 406a-406h. Although the beams 406a-406h are illustrated in FIG. 4 as being generated on wireless communication device 402, it should be understood that the same concepts described herein apply to beams generated on wireless communication device 404. For example, each wireless communication device 402 and 404 may select one or more beams to transmit sidelink signals to the other wireless communication device. In some examples, due to channel reciprocity, the selected beam(s) on each wireless communication device 402 and 404 may be used for both transmission and reception of sidelink signals. It should be noted that while some beams are illustrated as adjacent to one another, such an arrangement may be different in different aspects. In some examples, the wireless communication devices 402 and 404 may generate more or less beams distributed in different directions.

The number of beams on which a particular wireless communication device 402 or 404 may simultaneously communicate may be defined based on NR sidelink (SL) standards and specifications and capabilities of the wireless communication devices 402 and 404. For example, the number of beams may be determined based on a number of antenna panels configured on the wireless communication device 402 or 404. As an example, a wireless communication device 402 or 404 may include one or two antenna panels, and as such, may be configured to communicate on one or two beams, respectively, at a time. Each beam may be utilized to transmit a respective layer for MIMO communication. Other numbers of simultaneous beams are also possible in the present disclosure.

In some examples, to select one or more beams for communication on a sidelink between the two wireless communication devices 402 and 404, a first wireless communication device (e.g., wireless communication device 402) may transmit a sidelink reference signal, such as a sidelink synchronization signal block (SSB) or sidelink channel state information (CSI) reference signal (RS), on each of the plurality of beams 406a-406h in a beam-sweeping manner towards a second wireless communication device (e.g., wireless communication device 404). The second wireless communication device 404 searches for and identifies the beams based on the beam reference signals. The second wireless communication device 404 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 404 may then transmit a beam measurement report to the first wireless communication device 402 indicating the beam quality of one or more of the measured beams. The first wireless communication device or a radio access network (RAN) node (e.g., a base station or scheduling entity, such as a gNB) may then select the particular beam(s) for communication between the first and second wireless communication devices on the sidelink based on the beam measurement report. For example, the first wireless communication device may forward the beam measurement report to the base station for selection of the beam(s). The base station may then signal the selected beam(s) via, for example, a radio resource control (RRC) message or via a medium access control (MAC) control element (CE).

Each selected beam (e.g., beam 406d) on one of the wireless communication devices (e.g., wireless communication device 402) may form a beam pair link (BPL) 410 with a corresponding selected beam (e.g., beam 408d) on the other wireless communication device 404. Thus, each BPL includes corresponding transmit and receive beams on the wireless communication devices 402 and 404. For example, a BPL may include a first transmit/receive beam 406d on the first wireless communication device 402 and a second transmit/receive beam 408d on the second wireless communication device 404. To increase the data rate, multiple BPLs can be used to facilitate spatial multiplexing of multiple data streams. In some examples, the different BPLs can include beams from different antenna panels.

Figure 5:
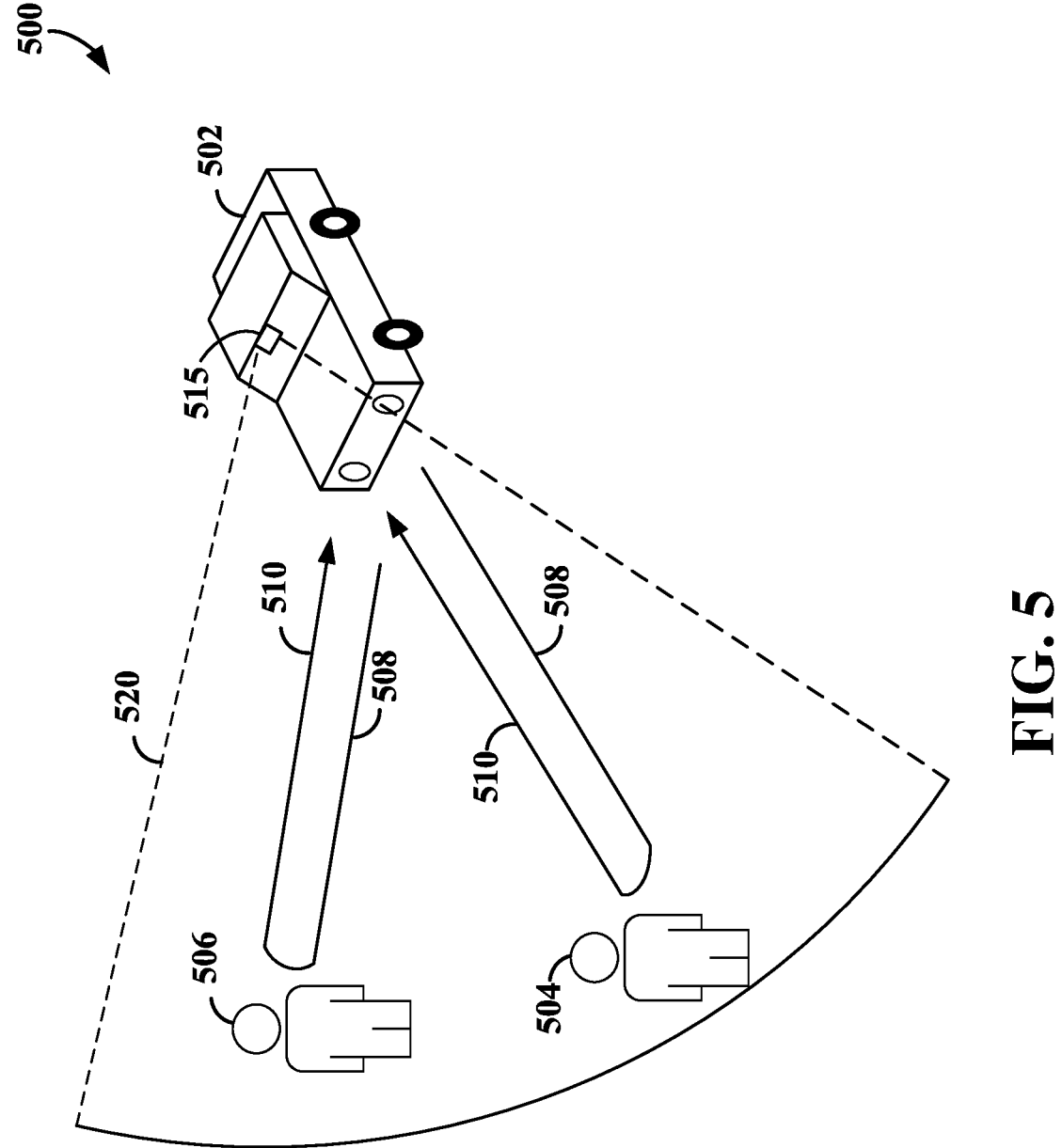
FIG. 5 is a diagram illustrating an example vehicle employing sensing devices to detect pedestrians or vulnerable road users according to some aspects.

A vehicular V2X device, such as V-UEs 302 and 304 shown in FIG. 3, may further be equipped with one or more sensing devices, for example, radar, lidar, and/or camera for sensing objects around or near the V2X device. FIG. 5 illustrates an exemplary V2X device (e.g., V-UE 502) employing the sensing devices to detect pedestrians (e.g., pedestrians 504 and 506) in proximity. In this example, V-UE 502 (e.g., a vehicle) may detect that pedestrians 504 and 506 (VRUs) are in proximity. In one example, V-UE 502 may be equipped with an automotive radar system including a radar/lidar transceiver. The automotive radar transceiver may be configured to transmit a radar signal 508 periodically at a high rate to sense the environment. The radar signal 508 may be reflected by surrounding objects (e.g., pedestrians 504 and 506), and the resulting radar echoes 510 may be received by the radar transceiver in full-duplex configuration. Based on the radar echoes 510, V-UE 502 can determine or estimate a distance and/or direction of the pedestrians. In some aspects, V-UE 502 may include one or more optical sensing devices 515 (e.g., camera and/or lidar) that can visually or optically detect 520 any object (e.g., pedestrians 504 and 506) that may be in proximity of the V-UE 502.

In some aspects, V-UE 502 may determine that a pedestrian (e.g., pedestrians 504 or 506) may be in a collision course with V-UE 502. In that case, V-UE 502 can send out a warning indication or alert to the pedestrian or a V2X device of the pedestrian. The pedestrian may carry a wireless communication device (e.g., V2X device or P-UE) that can receive the warning indication from V-UE 502. In some examples, a V2X device of the pedestrian (e.g., P-UE) can transmit its position periodically or aperiodically (e.g., event-based) along with identity information via an application-layer message such as the public safety message (PSM) using sidelink communication. In one example, a pedestrian or a V2X device of the pedestrian (e.g., pedestrian 504 or 506) may transmit a PSM with a certain periodicity (e.g., every 100 ms). A PSM is a data packet that can contain information about the speed, location, and direction of the pedestrian. Further, V-UE device 502 can transmit vehicle-to-pedestrian (V2P) messages or data packets with a certain periodicity or certain number of transmissions during an interval of time. In one example, a vehicle (e.g., V-UE 502) may transmit a number of basic safety messages (BSMs) per second. A BSM is a data packet that contains information about the position, heading, and speed of the vehicle, along with other information relating to a vehicle's state and predicted path.

In one aspect, a vehicle (e.g., V-UE 502) can receive a PSM from a pedestrian (e.g., pedestrians 504 and 506) and use the information included in the PSM to predict the trajectory and/or location of the pedestrian and determine whether a collision may occur between the vehicle and the pedestrian. If the vehicle determines that the pedestrian is at risk for being involved in a collision with the vehicle, the vehicle may transmit a collision indication or alert to the pedestrian (e.g., pedestrian 504). The collision indication or alert may be transmitted, for example, via a unicast message to the pedestrian or a V2X device carried by the pedestrian. In response to the alert message, the V2X device of the pedestrian may provide an audible, tactile, and/or visual alert to warn the pedestrian about the imminent or potential collision between the pedestrian and the vehicle. As a result, the pedestrian may take action to avoid the potential collision.

In some aspects, a V2X device can determine its location using a Global Navigation Satellite System (GNSS), for example, GPS, GLONASS, Galileo, and Beidou. A pedestrian (e.g., pedestrian 504 or 506) equipped with such V2X device can provide its location to other V2X devices (e.g., V-UE 502) in a sidelink message (e.g., PSM). However, the accuracy of GNSS-based location may be affected by various factors such as satellite signal obstructions and other environmental factors. Therefore, the GNSS-based location provided by a pedestrian or V2X device of the pedestrian may not be reliable and may be different from the location determined by a vehicle based on the vehicle's own sensors. For example, the vehicle 502 can obtain the location of a pedestrian or V2X device (e.g., pedestrian 504) through one or more sensors or means (e.g., camera, radar, and/or lidar).

In some aspects, techniques are disclosed to use data association between a vehicle and a pedestrian (or a V2X device of the pedestrian) to increase the vehicle's confidence or accuracy in determining the location of the pedestrian based on data obtained from vehicle's sensors (e.g., camera, radar, and/or lidar). Therefore, the vehicle can send out a collision warning indication to the correct pedestrian among multiple objects detected by the vehicle. Further, data association between the vehicle and pedestrian or a V2X device of the pedestrian can avoid false alarm issues. Data association also helps to fuse data to improve the location or state estimate of the pedestrian. In this disclosure, a vehicle or V2X device at the vehicle can be referred to as a V-UE, and a pedestrian or V2X device of the pedestrian can be referred to as a P-UE or VRU, for ease of description in the following examples. In some aspects, uncertainties in V-UE's determination of a P-UE position can be reduced by associating pedestrian-specific characteristics determined by the P-UE's and disseminated to the V-UE.

In one aspect, a P-UE (e.g., pedestrian 504) can have various sensors, for example, cellphone-based GNSS receiver and one or more motion sensors (e.g., accelerometers, gyroscope) for measuring position and motion (e.g., gait and/or speed) of the P-UE. In one example, the P-UE can obtain user-specific data or features about a pedestrian (i.e., the pedestrian associated with the P-UE) from one or more user-feature collecting devices (e.g., wearable devices) that are paired or associated with the P-UE. In some aspects, the user-feature collecting devices may include wearable devices (e.g., activity tracker, smartwatch, sport band, eyewear, wearable camera, etc.) that can provide user-specific features (e.g., heart rate, height, gender, weight, hair color, etc.) of the pedestrian to the P-UE. When the P-UE shares the user-specific features with the V-UE, the V-UE can compare the user-specific features provided by the P-UE against information (e.g., user features of pedestrians) collected from the V-UE's own sensors (e.g., camera, lidar, radar) to reduce object association and identification uncertainty. In some aspects, the V-UE can use machine learning (ML) methods to determine the correlation or association between its own sensor measurements or data (e.g., from a camera, radar, lidar, etc.) and the user-specific features provided by the P-UE.

Data Association of User-Specific Features in V2P Communication

Figure 6:
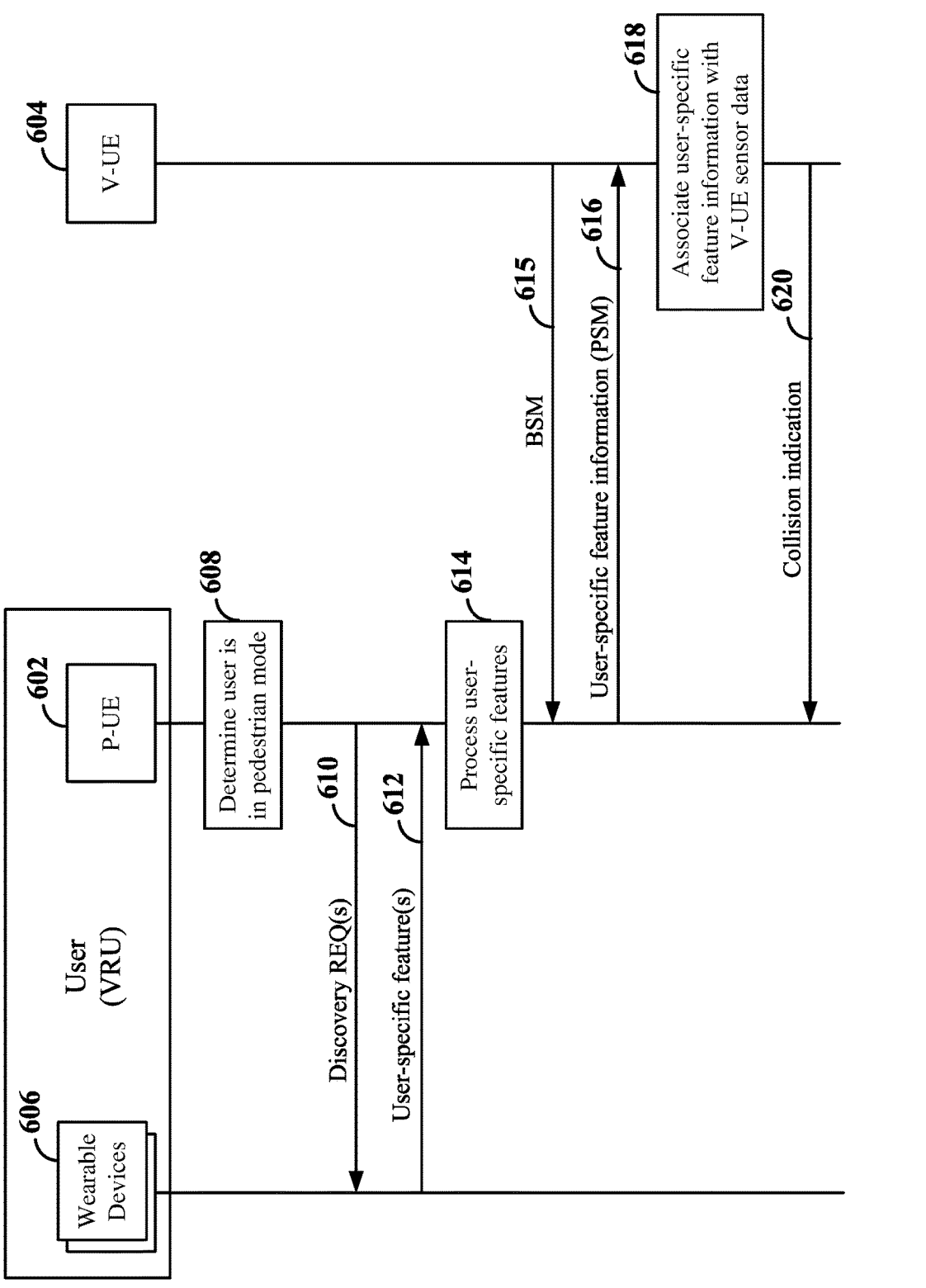
FIG. 6 is a diagram illustrating exemplary signaling between vehicle-to-everything (V2X) devices for associating data of user-specific features between V2X devices according to some aspects.

FIG. 6 is a diagram illustrating exemplary signaling between V2X devices for associating data of user-specific features between V2X devices according to some aspects. The V2X devices may include a P-UE 602 and a V-UE 604. The P-UE 602 and V-UE 604 may be any of the UEs, V2X devices, and scheduled entities shown in FIGS. 1 and 3-5. In one example, the P-UE 602 may be a V2X device (e.g., mobile phone) associated with or carried by a user or pedestrian. The P-UE 602 can communicate with and obtain user data (e.g., user features) from a plurality of sensors or monitoring devices (e.g., wearable devices 606).

At 608, the P-UE 602 can determine (e.g., predict or infer) if the P-UE or a user of the P-UE 602 is in a pedestrian mode of operation. For example, the P-UE or user may be equipped with one or more sensors or monitoring devices 606 (e.g., step tracker or accelerometer) that can determine or estimate the movement, speed, and/or gait of the user or P-UE. For example, if the user is moving at a speed slower than or equal to a predetermined threshold speed (e.g., 5 mph), the P-UE can determine that the user is in a pedestrian mode; otherwise, if the user is moving faster than the predetermined threshold speed, the P-UE can determine that the user is not in a pedestrian mode.

If the user/P-UE is in a pedestrian mode, the P-UE 602 can enable discovery of the data collecting devices or sensors (e.g., wearable devices 606), if any, associated with user/P-UE. In one aspect, at 610, the P-UE 602 can transmit a discovery signal (e.g., Discovery Req) to discover any available wearable devices that can provide data on user-specific features about the user, and request exchanging of the data on user-specific features. In one example, the P-UE 602 can transmit the discovery signal using wireless communication (e.g., sidelink, Bluetooth, Wi-Fi, etc.). The P-UE 602 may transmit the discovery signal 610 using a broadcast or unicast message. In one example, the one or more wearable devices 606 (e.g., smartwatch, fitness tracker, sport band, camera, etc.) may be paired or registered with the P-UE 602 at an earlier time. In that case, the P-UE 602 can communicate with the wearable devices 606 without using the discovery signal.

In one aspect, the P-UE 602 can obtain one or more user-specific features of the user from the one or more wearable devices 606. One or more of the wearable devices 606 can transmit data including certain user-specific features of the user to the P-UE 602. For example, a first wearable device can transmit a first message 612 indicating a first feature (e.g., heart rate), a second wearable device can transmit a second message 612 indicating a second user-specific feature (e.g., variations of blood pressure or blood pressure), and a third wearable device can transmit a third message indicating a third user-specific feature (e.g., walking speed, gait type, and/or rate of direction change). In other examples, the one or more wearable devices 606 may provide other types of user-specific features. At 614, the P-UE 602 gathers and processes the user-specific features (e.g., heart rate, a walking speed, gait type, a variation of walking speed, or a rate of direction change exhibited by the user, etc.) received from the wearable devices 606.

At 615, the V-UE 604 can transmit one or more BSMs indicating, for example, the speed, heading, and location of the V-UE. If the V-UE and P-UE are in sidelink communication range, at 616, the P-UE 602 can transmit a sidelink message containing the user-specific features, for example, in response to the BSMs at 615. In one example, the P-UE 602 can transmit the user-specific features as a part of a public safety message (PSM) along with a user identifier (e.g., UE id of P-UE 602).

At 618, the V-UE 604 can associate the user-specific features provided by the P-UE 602 with the V-UE's data on objects (e.g., pedestrians and objects) detected by the V-UE's sensors, for example, by a camera, lidar, and/or radar. The user-specific features (provided by P-UE) can help the V-UE 604 to identify the user/P-UE among the objects detected by the V-UE's sensors by associating the user-specific features provided by the P-UE with various features of an object detected by the V-UE.

At 620, the V-UE 604 can transmit a collision indication or alert to the P-UE 602 to indicate a potential collision between the V-UE and the user/P-UE. The collision indication or alert may be transmitted, for example, via a unicast or broadcast V2X message to the P-UE. The V-UE 604 can transmit the collision indication or alert when the P-UE 602 is in a collision path with the V-UE 604 based on the current or predicted location of the user/P-UE 602.

Figure 7:
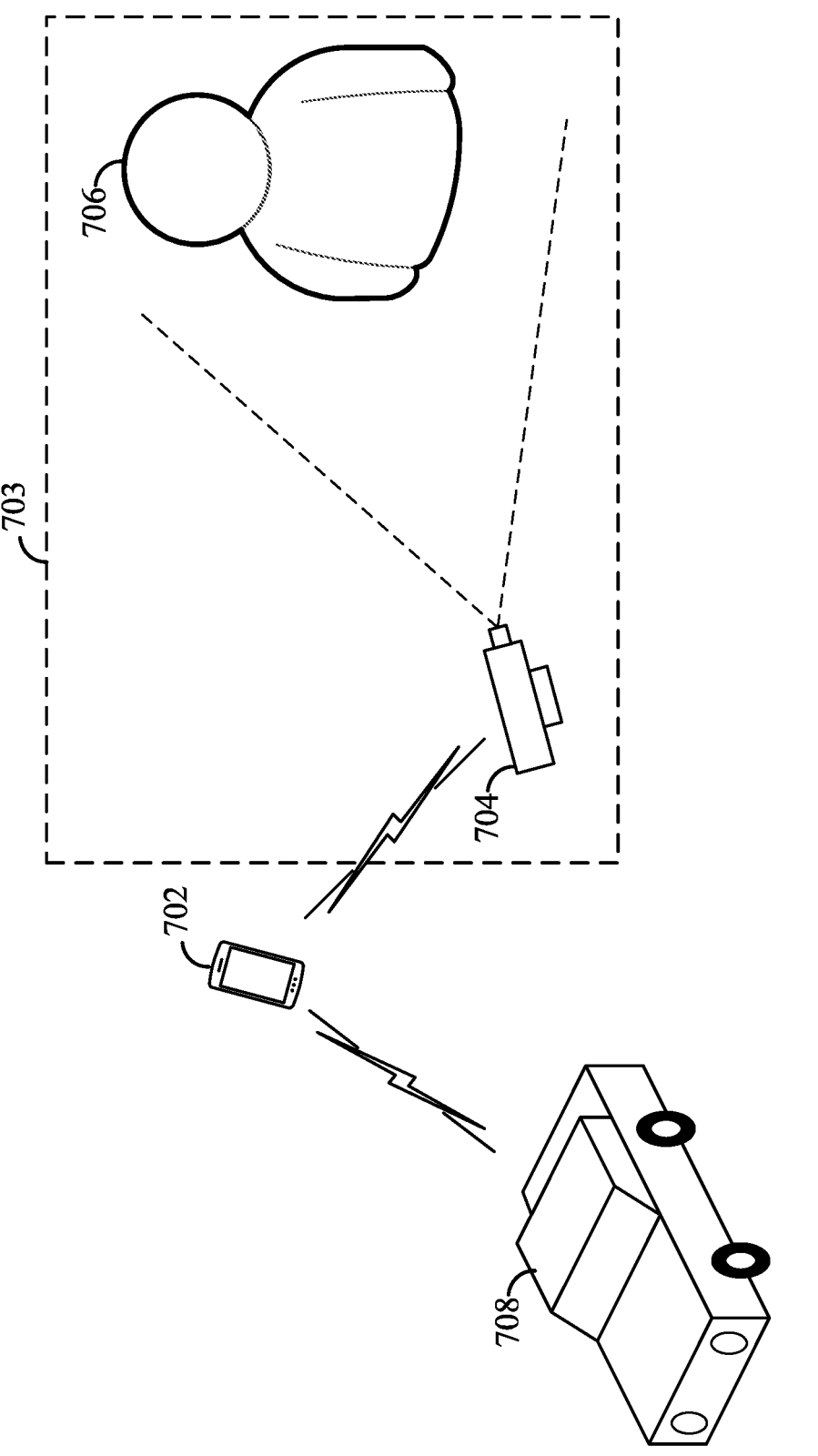
FIG. 7 is a diagram illustrating exemplary processes for obtaining user-specific features from a V2X device without user intervention according to some aspects.

FIG. 7 is a diagram illustrating exemplary processes for obtaining user-specific features from a V2X device without user intervention according to some aspects. In this disclosure, a P-UE 702 can obtain user-specific features not only from a wearable device. For example, the P-UE 702 can obtain user-specific features from any device that is associated with and in the communication range of the P-UE. In one example, the device may be a camera 704 mounted in a vehicle 703, and the camera 704 can communicate with the P-UE 702 to exchange information, for example, image data captured by the camera 704. The P-UE 702 may be the same as the P-UE/user 602 described in relation to FIG. 6 above. In one example, camera 704 (e.g., a dashcam) can obtain or capture an image of a person 706 when the person is inside the vehicle. In one aspect, the camera 704 can be configured to capture an image of the user of the P-UE 702 without user intervention when the user is in the vehicle 703. In one aspect, the camera 704 can capture various facial features or characteristics about the user such as hair color, presence/absence of hair, skin tone, etc. In some aspects, the camera 704 can capture facial features limited in certain areas (e.g., above the forehead and/or below the nose) to protect the user's privacy.

In some aspects, the camera 704 can provide the user-specific features to the P-UE 702 using wireless (e.g., Bluetooth or Wi-Fi) or wired communication (e.g., USB). In some aspects, the camera 704 can encode the user-specific features before transmitting the information to the P-UE 702. Encoding the user-specific features can reduce data size, increase data security, and/or protect the privacy of the user. In some aspects, the camera 704 can process an image of the user to obtain encoded user-specific features, for example, using convolutional neutral network (CNN) techniques. For example, the camera 704 can be configured to process the image to generate convolutional encoded user-specific features with preconfigured filter parameters such as filters for different convolutional layers, stride size of convolution across the image, and pooling configuration for reducing the size of encoded images (e.g., MAX pool, Average pool).

Alternately, in some aspects, the camera 704 can transmit the user image (e.g., image without privacy features of the user) to the P-UE 702, and the P-UE can perform the convolutional encoding with preconfigured filter parameters to obtain the encoded user-specific features. Later, when the user 706 is no longer in the vehicle, for example, in a pedestrian mode, the P-UE 702 can transmit (e.g., in a sidelink message, BSM) the encoded user-specific features of the user to a V-UE 708. That is, the P-UE 702 can obtain the user-specific features from the camera 704 when the user is in the vehicle (e.g., driving), and later provides the obtained user-specific features to the V-UE 708 when the user is in pedestrian mode.

After the V-UE 708 receives the user-specific features or data from the P-UE 702, the V-UE can associate the user-specific features received from the P-UE with data obtained by the V-UE's own sensors (e.g., camera, radar, and/or lidar) to improve accuracy or certainties for V2P use case scenarios, for example, selecting a pedestrian (e.g., a VRU) among multiple objects for receiving a collision alert or warning. In some aspects, the V-UE 708 can use machine learning (ML) methods and techniques to associate user-specific features received from the P-UE with features of objects observed or detected by the V-UE.

In one example, a P-UE can provide the user-specific features (e.g., height) as part of a sidelink message (e.g., PSM or the like), for example, when the P-UE (or a user of the P-UE) is in a pedestrian mode (e.g., moving below or equal to a speed threshold). In one example, the P-UE may transmit the user-specific features in a PSM 616 as shown above in FIG. 6. At the same time, a V-UE (e.g., V-UE 502) is approving the P-UE and can observe one or more objects (including the user of the P-UE) and determine certain features (e.g., image height) of the objects. For example, the V-UE 502 can use a front-facing camera 515 to determine or estimate the image height of the user based on one or more images of the user captured by the V-UE. By associating the user-specific features (e.g., the height of the user) from the P-UE with the features (e.g., image height) of an object detected by the V-UE, the V-UE can determine, with a high degree of certainty, the object corresponding to the P-UE/user among multiple objects (e.g., pedestrians) observed or detected by the V-UE.

Figure 8:
FIG. 8 is a flow chart illustrating an exemplary method for determining a height of a pedestrian based on an image according to some aspects.
Figure 8:
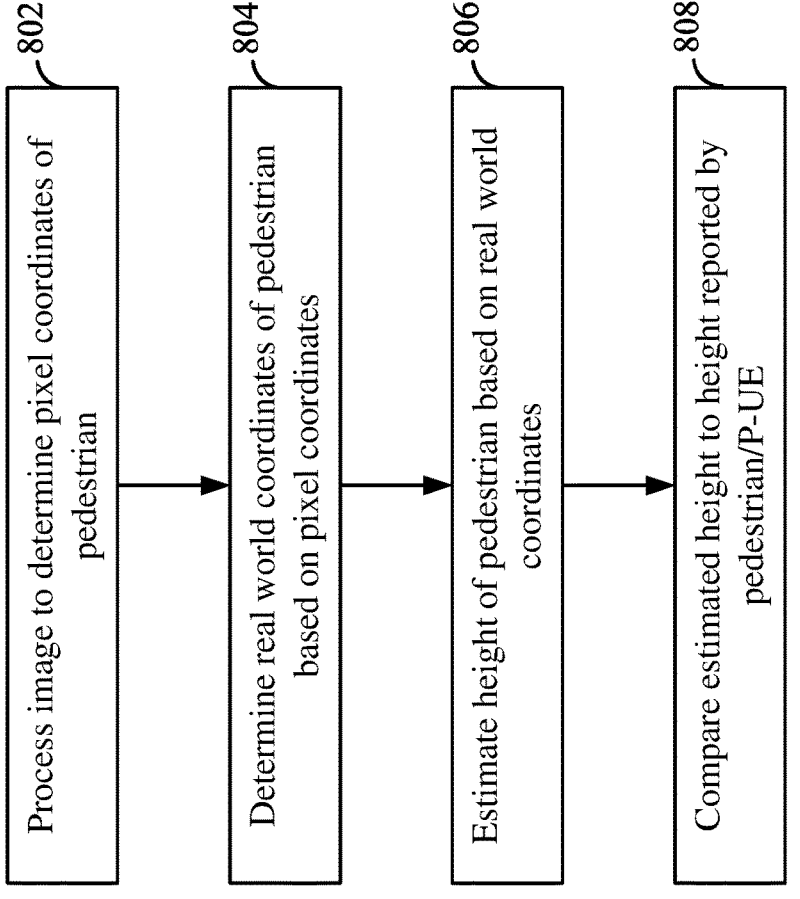

FIG. 8 is a flow chart illustrating a method 800 for determining a height of an object in an image according to some aspects. In one example, the V-UE 502 can use this method 800 to determine or estimate the height of a pedestrian (e.g., pedestrian 504 or 506) based on an image of the pedestrian captured by a camera of the V-UE. At 802, the V-UE can process an image of a pedestrian to determine the pixel coordinates (u1, v1) and (u2, v2) corresponding to the maximum height and minimum height of the pedestrian in the image relative to a reference (e.g., pixel at 0,0). For example, the pixel coordinate (u1, v1) corresponds to the maximum height, and the pixel coordinate (u2, v2) corresponds to the minimum height of the pedestrian.

At 804, the V-UE can determine the real world coordinates (x1, y1) and (x2, y2) corresponding to the pixel coordinates (u1, v1) and (u2, v2) using equations (1) to (4) below.

$$x1=(u1-ox)Z/f \tag{1}$$

$$y1=(v1-oy)Z/f \tag{2}$$

$$x2=(u2-ox)Z/f \tag{3}$$

$$y2=(v2-oy)Z/f \tag{4}$$

In equations (1) to (4), ox and oy are the center coordinates of the image, and Z corresponds to image depth (which is known to the V-UE based on camera design), and f is the focal length of the camera used by V-UE.

At 806, the V-UE can determine or estimate the real world height $\tilde{y}$ of the pedestrian using equation (5).

$$\tilde{y}=|y1-y2| \tag{5}$$

At 808, the V-UE can compare the estimated real world height, $\tilde{y}$ to the height reported by each P-UE/pedestrian through sidelink signaling (e.g., BSM). In one example, the pedestrian 504 and pedestrian 506 respectively provided their heights (H1 and H2) to the V-UE using BSM signaling. H1 is the height of pedestrian 504, and H2 is the height of pedestrian 506. The V-UE can determine whether the estimated height $\tilde{y}$ (i.e., user-specific feature) should be associated with the pedestrian 504 or 506 based on the difference between $\tilde{y}$ and H1/H2. For example, the V-UE can associate the height $\tilde{y}$ to the pedestrian with a height (e.g., H1 and H2) closer to the height $\tilde{y}$. With the data association, the V-UE can select the correct pedestrian for collision warning or alert when the pedestrian is likely to be in a collision path of the V-UE.

In some aspects, the V-UE can use a trained machine learning (ML) model to map or associate user-specific features reported by a P-UE with an object detected (e.g., using camera, radar, and/or lidar) by the V-UE. In some examples, the ML model may be provided by a RSU or gNB in communication with the V-UE or predefined according to a specification or standards (e.g., 3GPP NR standards). In some aspects, the P-UE can provide various user-specific features including, for example, heart rate, walking speed, variations of speed or number of steps per minute, types of gaits, rate of direction change, exhibited by the user of the P-UE. For example, the P-UE can obtain the user-specific features from one or more devices (e.g., wearable devices, dashcam, etc.) associated with the user and various internal sensors (e.g., gyroscope, accelerometer) of the P-UE. On the other hand, the V-UE can use its own sensors (e.g., camera, lidar, radar) to detect or measure features of the P-UE or user of the P-UE. For example, the V-UE can determine the height and motion (e.g., one or more gait features) of the user of the P-UE from an optical flow of segmented image of the user (e.g., motion vectors of segmented user). To create the segmented image of the user, the V-UE can extract the user out from an image (e.g., from other objects such as trees, buildings, light poles, etc.) so that the algorithm or ML model can focus on the actions or behavior the user to determine the physical characteristics (e.g., height, hair color, gait and other features). Using the trained ML model, the V-UE can predict which user-specific feature transmitted by the P-UE should be mapped or associated with the features of one or more objects detected by the V-UE's own sensors.

Figure 9:
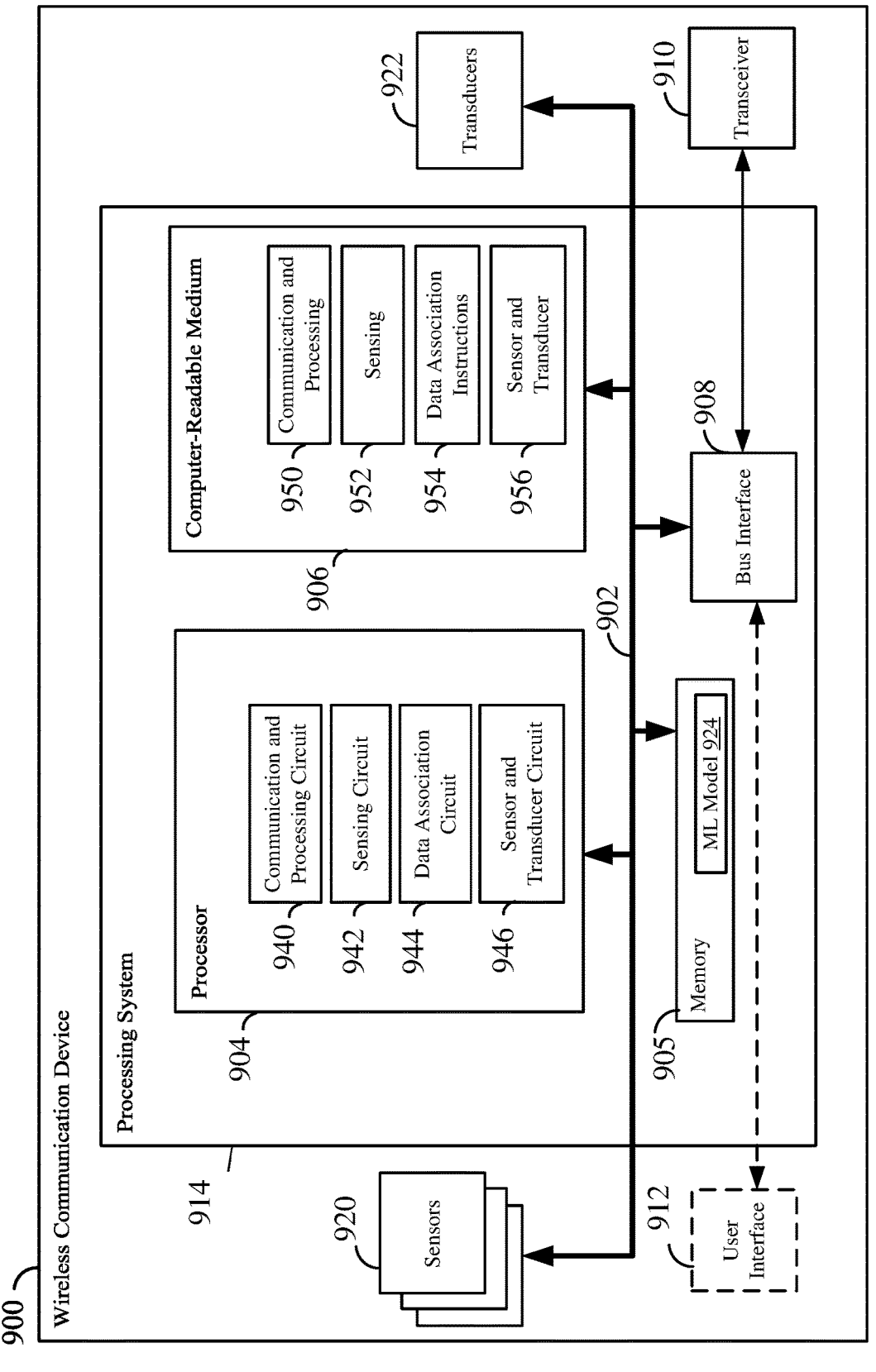
FIG. 9 is a block diagram illustrating an example of a hardware implementation for a wireless communication device according to some aspects.

FIG. 9 is a block diagram illustrating an example of a hardware implementation for a wireless communication device 900 employing a processing system 914. For example, the wireless communication device 900 may be a user equipment (UE), scheduled entity, or a V2X device as illustrated in any one or more of FIGS. 1 and 3-7.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in a wireless communication device 900, may be used to implement any one or more of the processes and procedures described and illustrated in FIGS. 3-8, 10, and 11.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902, a communication transceiver 910, one or more sensors 920, and one or more transducers 922. In some aspects, the sensors 920 may include a camera, a lidar, a radar, a GNSS receiver, etc. In some aspects, the one or more transducers 922 may include a speaker, a vibrator, a buzzer, a light-emitting device, etc. that can be configured to generate an audio, visual, and/or tactile alert to a user of the wireless communication device. The communication transceiver 910 provides a communication interface or means for communicating with various other apparatus (e.g., V2X devices) over a transmission medium. Depending upon the nature of the apparatus, a user interface 912 (e.g., keypad, display, speaker, microphone, joystick) may also be provided. Of course, such a user interface 912 is optional, and may be omitted in some examples, such as a base station.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store a machine learning (ML) model 924 that can be used to process and associate data obtained from different sources, for example, the wireless communication devices 900 and other devices (e.g., wearable devices, V2X devices, etc.).

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 940 configured for various functions, including for example communicating with one or more other wireless communication devices over a wireless interface, for example, a D2D interface (e.g., sidelink or PC5). In some examples, the communication and processing circuitry 940 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 940 may include one or more transmit/ receive chains. The communication and processing circuitry 940 may further be configured to execute communication and processing software 950 stored on the computer-readable medium 906 to implement one or more functions described herein.

In some implementations where the communication involves receiving information, the communication and processing circuitry 940 may obtain information from a component of the wireless communication device 900 (e.g., from the transceiver 910 that receives the information via radio frequency signaling or some other type of signaling suitable for the applicable communication medium), process (e.g., decode) the information, and output the processed information. For example, the communication and processing circuitry 940 may output the information to another component of the processor 904, to the memory 905, or to the bus interface 908. In some examples, the communication and processing circuitry 940 may receive one or more of signals, messages, other information, or any combination thereof. In some examples, the communication and processing circuitry 940 may receive information via one or more channels. In some examples, the communication and processing circuitry 940 may include functionality for a means for receiving. In some examples, the communication and processing circuitry 940 may include functionality for a means for processing, including a means for demodulating, a means for decoding, etc.

In some implementations where the communication involves sending (e.g., transmitting) information, the communication and processing circuitry 940 may obtain information (e.g., from another component of the processor 904, the memory 905, or the bus interface 908), process (e.g., modulate, encode, etc.) the information, and output the processed information. For example, the communication and processing circuitry 940 may output the information to the transceiver 910 (e.g., that transmits the information via radio frequency signaling or some other type of signaling suitable for the applicable communication medium). In some examples, the communication and processing circuitry 940 may send one or more of signals, messages, other information, or any combination thereof. In some examples, the communication and processing circuitry 940 may send information via one or more channels. In some examples, the communication and processing circuitry 940 may include functionality for a means for sending (e.g., a means for transmitting). In some examples, the communication and processing circuitry 940 may include functionality for a means for generating, including a means for modulating, a means for encoding, etc.

The processor 904 may further include sensing circuitry 942, configured to detect or sense objects (e.g., pedestrians or vehicles) in the vicinity of the wireless communication device. For example, the sensing circuitry 942 can receive data from the sensors 920 (e.g., camera, radar, lidar) to detect object(s) within a detection zone or area of the wireless communication device. The sensing circuitry 942 may further include a gyroscope and/or an accelerometer for detecting the motion of the wireless communication device. The sensing circuitry 942 may further include a GNSS receiver for determining a location or position of the wireless communication device 900 using satellite-based positioning. In one aspect, the sensing circuitry 942 can be configured to determine one or more user-specific features (e.g., height and one or more gait types) of a pedestrian that can be detected by the sensors 920. The sensing circuitry 942 may further be configured to execute sensing software 952 stored in the computer-readable medium 906 to implement one or more of the functions described herein.

The processor 904 may further include data association circuitry 944, configured to associate data (e.g., user-specific features) pertaining to various objects (e.g., pedestrians) detected by the wireless communication device 900. In one aspect, the data association circuitry 944 can associate user-specific features obtained from another wireless communication device (e.g., P-UE) with an object (e.g., pedestrian) detected by the sensors 920. The user-specific features may include, for example, a height, a heart rate, a walking speed, a variation of walking speed, a gait type, and/or a rate of direction change. The data association circuitry 944 may further be configured to execute data association software 954 stored in the computer-readable medium 906 to implement one or more of the functions described herein.

The processor 904 may further include sensor and transducer circuitry 946, configured to control, transmit, and receive data to/from the sensors 920 and the transducers 922. In one example, the processor 904 can be configured to receive data (e.g., height, hair color, gait type, a rate of direction change) pertaining to a pedestrian from the sensors 920. In one example, the processor 904 can be configured to control the transducers 922 to generate an audio, visual, and/or tactile indication that can alert a user (e.g., pedestrian) of the wireless communication device about a potential collision with a vehicle (e.g., V-UE 502). The sensor and transducer circuitry 946 may further be configured to execute sensor and transducer software 956 stored in the computer-readable medium 906 to implement one or more of the functions described herein.

FIG. 10 is a flow chart of an exemplary process 1000 for transmitting a warning to a pedestrian using data association between a V-UE and a P-UE in accordance with some aspects. As described below, some or all illustrated features may be omitted in a particular implementation within the scope of the present disclosure, and some illustrated features may not be required for implementations. In some examples, the process 1000 may be carried out by the wireless communication device 900 illustrated in FIG. 9. In some examples, the process 1000 may be carried out by any suitable apparatus or means for carrying out the functions or algorithm described below. In some aspects, the wireless communication device 900 may be implemented as a V-UE (e.g., V-UE 502, 604, 708)

At block 1002, a V-UE can detect one or more objects in the vicinity of the V-UE. In one aspect, the sensors 920 and sensing circuitry 942 may provide a means to detect the one or more objects in the vicinity of the V-UE. For example, the sensors 920 may include a camera, radar, and/or a lidar that can detect the one or more objects. The objects may include a pedestrian or a P-UE. The vicinity of the V-UE may include an area within an effective detection or sensing range of one or more of the sensors 920. In one example, one of the detected object may be a pedestrian who may be or moving in a collision path with the V-UE.

At block 1004, the V-UE can receive a sidelink message from a wireless communication device, the second sidelink message comprising a plurality of first features pertaining to a user of the wireless communication device. In one aspect, the communication and processing circuitry 940 can provide a means to receive the sidelink message. In one example, the sidelink message may be a public safety message (PSM) that includes the plurality of first features. In some aspects, the plurality of first features include user-specific features pertaining to the user, for example, a heart rate, a walking speed, a variation of walking speed or steps, a gait type, a rate of direction change exhibited by the user, etc.

At block 1006, the V-UE can associate the plurality of first features to a first object among the one or more object. In one aspect, the data association circuitry 944 can provide a means to associate the plurality of first features with the first object (e.g., data or features associated with the first object). In one example, the V-UE can identify a plurality of second features of the first object, and associate the plurality of first features with the plurality of second features using a predetermined rule. In one aspect, the association between the first features and the first object may be based on a ML model 924 (predetermined rule) that maps the first features provided by the wireless communication device (e.g., a P-UE) with certain measurements or features of the objects obtained from sensors 920.

At block 1008, the V-UE can transmit a warning to the wireless communication device in response to a determination that the first object is or may be in a collision path with the V-UE. The communication and processing circuitry 940 can provide a means to transmit the warning (e.g., a sidelink message) to the wireless communication via the transceiver 910.

In one aspect, the data association circuitry 944 can provide a means to associate the plurality of first features with the first object (or data or features associated with the first object). In one example, the V-UE can identify a plurality of second features of the first object, and associate the plurality of first features with the plurality of second features using a predetermined rule. In one aspect, the association between the first features and the first object may be based on a ML model 924 (predetermined rule) that maps the first features provided by the wireless communication device (e.g., a P-UE) with certain measurements or features of the objects obtained from sensors 920.

In one configuration, the wireless communication device 900 includes means for transmitting a warning to a pedestrian (e.g., a user of a P-UE) using data association between the V-UE and P-UE as described above. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1 and 3-7, and utilizing, for example, the processes and/or algorithms described herein in relation to FIG. 10.

FIG. 11 is a flow chart illustrating an exemplary process 1100 for collecting and communicating user-specific features to a vehicle using sidelink communication in accordance with some aspects. As described below, some or all illustrated features may be omitted in a particular implementation within the scope of the present disclosure, and some illustrated features may not be required for implementations. In some examples, the process 1100 may be carried out by the wireless communication device 900 illustrated in FIG. 9. In some examples, the process 1100 may be carried out by any suitable apparatus or means for carrying out the functions or algorithm described below. In some aspects, the wireless communication device 900 may be implemented as a P-UE (e.g., P-UE 602, 702).

At block 1102, a P-UE can receive, from one or more sensing devices in the vicinity of the P-UE, data pertaining to a plurality of features of a user associated with or operating the P-UE. In one aspect, the communication and processing circuit 940 can provide a means to receive the data from the one or more sensing devices. The P-UE can communicate with the one or more sensing devices using wired or wireless communication (e.g., Bluetooth, Wi-Fi, etc.). In one aspect, the one or more sensing devices may include various devices (e.g., activity tracker, smartwatch, sport band, eyewear, wearable camera, dashcam) that can provide the plurality of features (e.g., heart rate, height, gender, weight, hair color, etc.) of the user to the P-UE.

At block 1104, the P-UE can transmit, to a V-UE (e.g., vehicle), a sidelink message (e.g., PSM) comprising data pertaining to the plurality of features. In one aspect, the communication and processing circuit 940 can provide a means to transmit the sidelink message to the V-UE, for example, using the transceiver 910. The sidelink message can further contain information about the speed, location, and direction of the user, as well as the plurality of features (e.g., heart rate, height, gender, weight, hair color, etc.).

At block 1106, the P-UE can receive, from the V-UE, a warning that indicates a potential collision between the user and the V-UE, the warning generated by the V-UE based on an association between the plurality of features and an object detected at the V-UE. In one aspect, the communication and processing circuit 940 can provide a means to receive the warning from the V-UE via the transceiver 910. The warning (e.g., collision indication 620) may cause the P-UE to provide an audible, tactile, and/or visual alert to the user to attempt to prevent the collision between the user and the V-UE. The transducers 922 may provide a means to generate an alert to warn the user about the potential collision. The V-UE can associate its own sensor data on the user with the plurality of features pertaining to the user to improve the accuracy of identifying the correct object detected by the V-UE that corresponds to the user/P-UE.

In one configuration, the wireless communication device 900 includes means for collecting and communicating user-specific features to a vehicle using sidelink communication as described herein. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1 and 3-7, and utilizing, for example, the processes and/or algorithms described herein in relation to FIG. 11.

In a first aspect, a user equipment (UE) in a wireless communication network is provided. The UE comprises: a communication transceiver; a sensor; a memory; and a processor coupled to the communication transceiver, the sensor, and the memory, wherein the processor and the memory are configured to: detect, using the sensor, one or more objects in a vicinity of the UE; receive a sidelink message from a wireless communication device via the communication transceiver, the sidelink message comprising a plurality of first features pertaining to a user of the wireless communication device; associate the plurality of first features to a first object among the one or more objects; and transmit a warning to the wireless communication device in response to a determination that the first object is in a collision path with the UE.

In a second aspect, alone or in combination with the first aspect, wherein the plurality of first features comprise at least one of a heart rate, a walking speed, a variation of walking speed, a gait type, or a rate of direction change exhibited by the user.

In a third aspect, alone or in combination with any of the first and second aspects, wherein the processor and the memory are further configured to: identify a plurality of second features of the first object; and associate the plurality of first features with the plurality of second features using a predetermined rule.

In a fourth aspect, alone or in combination with the third aspect, wherein the plurality of second features comprise at least one of a height, a gait type, or a speed.

In a fifth aspect, alone or in combination with any of the third and fourth aspects, wherein the predetermined rule comprises a machine learning model.

In a sixth aspect, alone or in combination with any of the first to fifth aspects, wherein: the plurality of first features comprises a reported height of the user; and the processor and the memory are further configured to: receive image data from the sensor, the image data comprising a plurality of pixels representing the one or more objects; process the image data to estimate an image height of each of the one or more objects; and compare the reported height of the user to the image height to identify the first object corresponding to the user.

In a seventh aspect, alone or in combination with any of the first to second aspects, wherein the processor and the memory are further configured to: identify a plurality of second features of the first object using data from the sensor; and map the plurality of first features to the plurality of second features using a machine learning model to associate the user with the first object.

In an eighth aspect, a user equipment (UE) in a wireless communication network is provided. The UE comprises: a communication transceiver; a memory; and a processor coupled to the communication transceiver and the memory, wherein the processor and the memory are configured to: receive, from one or more sensing devices in a vicinity of the UE, data pertaining to a plurality of features of a user associated with the UE; transmit, to a vehicle, a sidelink message comprising data pertaining to the plurality of features; and receive, from the vehicle, a warning that indicates a potential collision between the user and the vehicle, the warning generated by the vehicle based on an association between the plurality of features and an object detected at the vehicle.

In a ninth aspect, alone or in combination with the eighth aspect, wherein the processor and the memory are further configured to: determine that the user is in a pedestrian mode; and in response to determining that the user is in the pedestrian mode, transmit the sidelink message comprising the data pertaining to the plurality of features.

In a tenth aspect, alone or in combination with any of the eighth to ninth aspects, wherein the processor and the memory are further configured to: transmit a discovery signal to request data exchange with the one or more sensing devices; and receive, from the one or more sensing devices, the data pertaining to the plurality of features.

In an eleventh aspect, alone or in combination with any of the eighth to tenth aspects, wherein the one or more sensing devices comprise at least one of: one or more wearable devices configured to obtain the plurality of features of the user; or a camera configured to capture an image of the user.

In a twelfth aspect, alone or in combination with the eleventh aspect, wherein the processor and the memory are further configured to receive image data from the camera, the image data comprising convolutionally encoded features based on the image of the user.

In a thirteenth aspect, alone or in combination with the eleventh aspect, wherein the processor and the memory are further configured to: receive image data from the camera, the image data comprising one or more features of the user; and perform convolutional encoding on the image data.

In a fourteenth aspect, alone or in combination with any of the eighth to thirteenth aspects, wherein the plurality of features comprise at least one of a height, a heart rate, a speed, a variation of speed, a gait type, or a rate of direction change.

In a fifteenth aspect, alone or in combination with any of the eighth to fourteenth aspects, wherein the processor and the memory are further configured to: in response to the warning, generate at least one of an audio, visual, or tactile alert to warn the user on a potential collision with the vehicle.

In a sixteenth aspect, a method of wireless communication by a user equipment (UE) is provided. The method comprises: detecting one or more objects in a vicinity of the UE; receiving a sidelink message from a wireless communication device, the sidelink message comprising a plurality of first features pertaining to a user of the wireless communication device; associating the plurality of first features to a first object among the one or more objects; and transmitting a warning to the wireless communication device in response to a determination that the first object is in a collision path with the UE.

In a seventeenth aspect, alone or in combination with the sixteenth aspect, wherein the plurality of first features comprise at least one of a heart rate, a walking speed, a variation of walking speed, a gait type, or a rate of direction change exhibited by the user.

In an eighteenth aspect, alone or in combination with any of the sixteenth to seventeenth aspects, the method further comprises: identifying a plurality of second features of the first object; and associating the plurality of first features with the plurality of second features using a predetermined rule.

In a nineteenth aspect, alone or in combination with the eighteenth aspect, wherein the plurality of second features comprise at least one of a height, a gait type, or a speed.

In a twentieth aspect, alone or in combination with any of the eighteenth to nineteenth aspects, wherein the predetermined rule comprises a machine learning model.

In a twenty-first aspect, alone or in combination with any of the sixteenth to twentieth aspects, wherein: the plurality of first features comprises a reported height of the user; and the method further comprises: receiving image data from a sensor of the UE, the image data comprising a plurality of pixels representing the one or more objects; processing the image data to estimate an image height of each of the one or more objects; and comparing the reported height of the user to the image height to identify the first object corresponding to the user.

In a twenty-second aspect, alone or in combination with any of the sixteenth to seventeenth aspects, the method further comprises: identifying a plurality of second features of the first object using data from a sensor of the UE; and mapping the plurality of first features to the plurality of second features using a machine learning model to associate the user with the first object.

In a twenty-third aspect, a method for wireless communication by a user equipment (UE) is provided. The method comprises: receiving, from one or more sensing devices in a vicinity of the UE, data pertaining to a plurality of features of a user associated with the UE; transmitting, to a vehicle, a sidelink message comprising data pertaining to the plurality of features; and receiving, from the vehicle, a warning that indicates a potential collision between the user and the vehicle, the warning generated by the vehicle based on an association between the plurality of features and an object detected at the vehicle.

In a twenty-fourth aspect, alone or in combination with the twenty-third aspect, the method further comprises: determining that the user is in a pedestrian mode; and in response to determining that the user is in the pedestrian mode, transmitting the sidelink message comprising the data pertaining to the plurality of features.

In a twenty-fifth aspect, alone or in combination with any of the twenty-third to twenty-fourth aspects, the method further comprises: transmitting a discovery signal to request data exchange with the one or more sensing devices; and receiving, from the one or more sensing devices, the data pertaining to the plurality of features.

In a twenty-sixth aspect, alone or in combination with any of the twenty-third to twenty-fifth aspects, wherein the one or more sensing devices comprise at least one of: one or more wearable devices configured to obtain the plurality of features of the user; or a camera configured to capture an image of the user.

In a twenty-seventh aspect, alone or in combination with the twenty-sixth aspect, the method further comprises: receiving image data from the camera, the image data comprising convolutionally encoded features based on the image of the user.

In a twenty-eighth aspect, alone or in combination with the twenty-sixth aspect, the method further comprises: receiving image data from the camera, the image data comprising one or more features of the user; and performing convolutional encoding on the image data.

In a twenty-ninth aspect, alone or in combination with any of the twenty-third to twenty-eighth aspects, wherein the plurality of features comprise at least one of a height, a heart rate, a speed, a variation of speed, a gait type, or a rate of direction change.

In a thirtieth aspect, alone or in combination with any of the twenty-third to twenty-ninth aspects, the method further comprises: in response to the warning, generating at least one of an audio, visual, or tactile alert to warn the user on a potential collision with the vehicle.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE), comprising:
at least one transceiver;
at least one memory comprising instructions; and
one or more processors configured to execute the instructions to cause the UE to:
determine that a user of the UE or the UE is in a pedestrian mode;
transmit, via the at least one transceiver and in response to determining that the user or the UE is in the pedestrian mode, a discovery signal to discover one or more wearable devices that provide data on a plurality of user-specific features about the user, the UE and the one or more wearable devices associated with the user of the UE;
receive, via the at least one transceiver and from the one or more wearable devices in a vicinity of the UE, data pertaining to the plurality of user-specific features of the user associated with the UE;
transmit, via the at least one transceiver to a vehicle and in response to determining that the user or the UE is in the pedestrian mode, a sidelink message comprising the data pertaining to the plurality of user-specific features; and
receive, via the at least one transceiver and from the vehicle, a warning that indicates a potential collision between the user and the vehicle, the warning being based at least in part on the plurality of user-specific features.

2. The UE of claim 1, wherein the one or more processors are further configured to cause the UE to receive, via the at least one transceiver, image data from a camera, the image data comprising convolutionally encoded features based on an image of the user.

3. The UE of claim 1, wherein the one or more processors are further configured to cause the UE to:
receive, via the at least one transceiver, image data from a camera, the image data comprising one or more features of the user; and
perform convolutional encoding on the image data to obtain encoded user-specific features.

4. The UE of claim 1, wherein the plurality of user-specific features further comprise at least one of a height, a heart rate, or a rate of direction change.

5. The UE of claim 1, wherein the one or more processors are further configured to cause the UE to:
in response to the warning, generate at least one of an audio, visual, or tactile alert to warn the user on a potential collision with the vehicle.

6. A method for wireless communication by a user equipment (UE), comprising:
determining that a user of the UE or the UE is in a pedestrian mode;
transmitting, in response to determining that the user or the UE is in the pedestrian mode, a discovery signal to discover one or more wearable devices that provide data on a plurality of user-specific features about the user, the UE and the one or more wearable devices associated with the user of the UE;

receiving, from the one or more wearable devices in a vicinity of the UE, data pertaining to the plurality of user-specific features of the user associated with the UE;

transmitting, to a vehicle and in response to determining that the user or the UE is in the pedestrian mode, a sidelink message comprising the data pertaining to the plurality of user-specific features; and receiving, from the vehicle, a warning that indicates a potential collision between the user and the vehicle, the warning being based at least in part on the plurality of user-specific features.

7. The method of claim 6, further comprising:

receiving image data from a camera, the image data comprising convolutionally encoded features based on an image of the user.

8. The method of claim 6, further comprising:

receiving image data from a camera, the image data comprising one or more features of the user; and performing convolutional encoding on the image data to obtain encoded user-specific features.

9. The method of claim 6, wherein the plurality of user-specific features further comprise at least one of a height, a heart rate, or a rate of direction change.

10. The method of claim 6, further comprising:

in response to the warning, generating at least one of an audio, visual, or tactile alert to warn the user on a potential collision with the vehicle.

11. The UE of claim 1, wherein the plurality of user-specific features further comprise at least one of heart rate, height, gender, or weight.

12. The method of claim 6, wherein the plurality of user-specific features further comprise at least one of heart rate, height, gender, or weight.

13. The UE of claim 1, wherein the user is determined to be in the pedestrian mode in response to a speed of the user being less than or equal to a predetermined threshold value.

14. The method of claim 6, wherein the user is determined to be in the pedestrian mode in response to a speed of the user being less than or equal to a predetermined threshold value.

15. A non-transitory computer-readable medium storing a set of instructions that when executed by one or more processors of a user equipment (UE) causes the UE to:

transmit, via the at least one transceiver, a discovery signal to discover one or more wearable devices that provide data on a plurality of user-specific features about a user of the UE, the UE and the one or more wearable devices associated with the user of the UE;

receive, via the at least one transceiver and from the one or more wearable devices in a vicinity of the UE, data pertaining to the plurality of user-specific features of the user associated with the UE, the plurality of user-specific features comprises a hair color;

transmit, via the at least one transceiver and to a vehicle, a sidelink message comprising the data pertaining to the plurality of user-specific features; and receive, via the at least one transceiver and from the vehicle, a warning that indicates a potential collision between the user and the vehicle, the warning being based at least in part on the plurality of user-specific features.

16. The non-transitory computer-readable medium of claim 15, wherein the one or more processors are further configured to cause the UE to receive, via the at least one transceiver, image data from a camera, the image data comprising convolutionally encoded features based on an image of the user.

17. The non-transitory computer-readable medium of claim 15, wherein the one or more processors are further configured to cause the UE to:

receive, via the at least one transceiver, image data from a camera, the image data comprising one or more features of the user; and perform convolutional encoding on the image data to obtain encoded user-specific features.

18. The non-transitory computer-readable medium of claim 15, wherein the plurality of user-specific features further comprise at least one of a height, a heart rate, or a rate of direction change.

19. The non-transitory computer-readable medium of claim 15, wherein the one or more processors are further configured to cause the UE to:

in response to the warning, generate at least one of an audio, visual, or tactile alert to warn the user on a potential collision with the vehicle.

20. The non-transitory computer-readable medium of claim 15, wherein the plurality of user-specific features further comprise at least one of heart rate, height, gender, or weight.

* * * * *